United States Patent
Tang et al.

(10) Patent No.: US 8,109,031 B2
(45) Date of Patent: Feb. 7, 2012

(54) ELECTRONIC SIGHT AND MANUFACTURING METHOD THEREOF

(75) Inventors: Chia-Chi Tang, Taichung (TW); Chen-Yeh Lin, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 167 days.

(21) Appl. No.: 12/337,711

(22) Filed: Dec. 18, 2008

(65) Prior Publication Data

US 2010/0088907 A1    Apr. 15, 2010

(30) Foreign Application Priority Data

Oct. 15, 2008    (TW) .................. 97139493 A

(51) Int. Cl.
*F41G 1/30* (2006.01)
*F41G 1/00* (2006.01)
*G02B 23/10* (2006.01)

(52) U.S. Cl. .......................... 42/132; 42/113

(58) Field of Classification Search .......... 42/113, 42/123, 131, 132; 33/263; 430/319
See application file for complete search history.

(56) References Cited

U.S. PATENT DOCUMENTS

| | | | | |
|---|---|---|---|---|
| 2,596,522 A * | 5/1952 | Bethke | ................ | 42/113 |
| 3,645,635 A * | 2/1972 | Steck | ................ | 356/252 |
| 4,554,744 A * | 11/1985 | Huckenbeck | ................ | 42/113 |
| 4,665,622 A * | 5/1987 | Idan | ................ | 42/113 |
| 5,383,278 A * | 1/1995 | Kay | ................ | 33/265 |
| 5,724,181 A * | 3/1998 | Negishi | ................ | 359/428 |
| 6,327,806 B1 * | 12/2001 | Paige | ................ | 42/113 |
| 2001/0005527 A1 * | 6/2001 | Vaeth | ................ | 427/248.1 |
| 2002/0078618 A1 * | 6/2002 | Gaber | ................ | 42/123 |
| 2006/0113054 A1 * | 6/2006 | Silvestrini | ................ | 164/46 |
| 2008/0233287 A1 * | 9/2008 | Shtein et al. | ................ | 427/255.6 |

* cited by examiner

*Primary Examiner* — Bret Hayes
(74) *Attorney, Agent, or Firm* — Thomas|Kayden

(57) ABSTRACT

The electronic sight includes a base, an optical window, a point light source, a photomask and a low-reflective layer. The optical window is disposed on a first end of the base. The point light source, disposed on a second end of the base, provides a lightbeam. The photomask is disposed between the point light source and the optical window, and the low-reflective layer is formed thereon. The lightbeam passes through the photomask along a first direction, hits the optical window, and is reflected toward a second direction by the optical window. The method for manufacturing the electronic sight includes: providing a base; providing an optical window disposed on a first end of the base; providing a point light source disposed on a second end of the base; providing a photomask; forming a low-reflective layer on the photomask; and positioning the photomask between the point light source and the optical window.

14 Claims, 5 Drawing Sheets

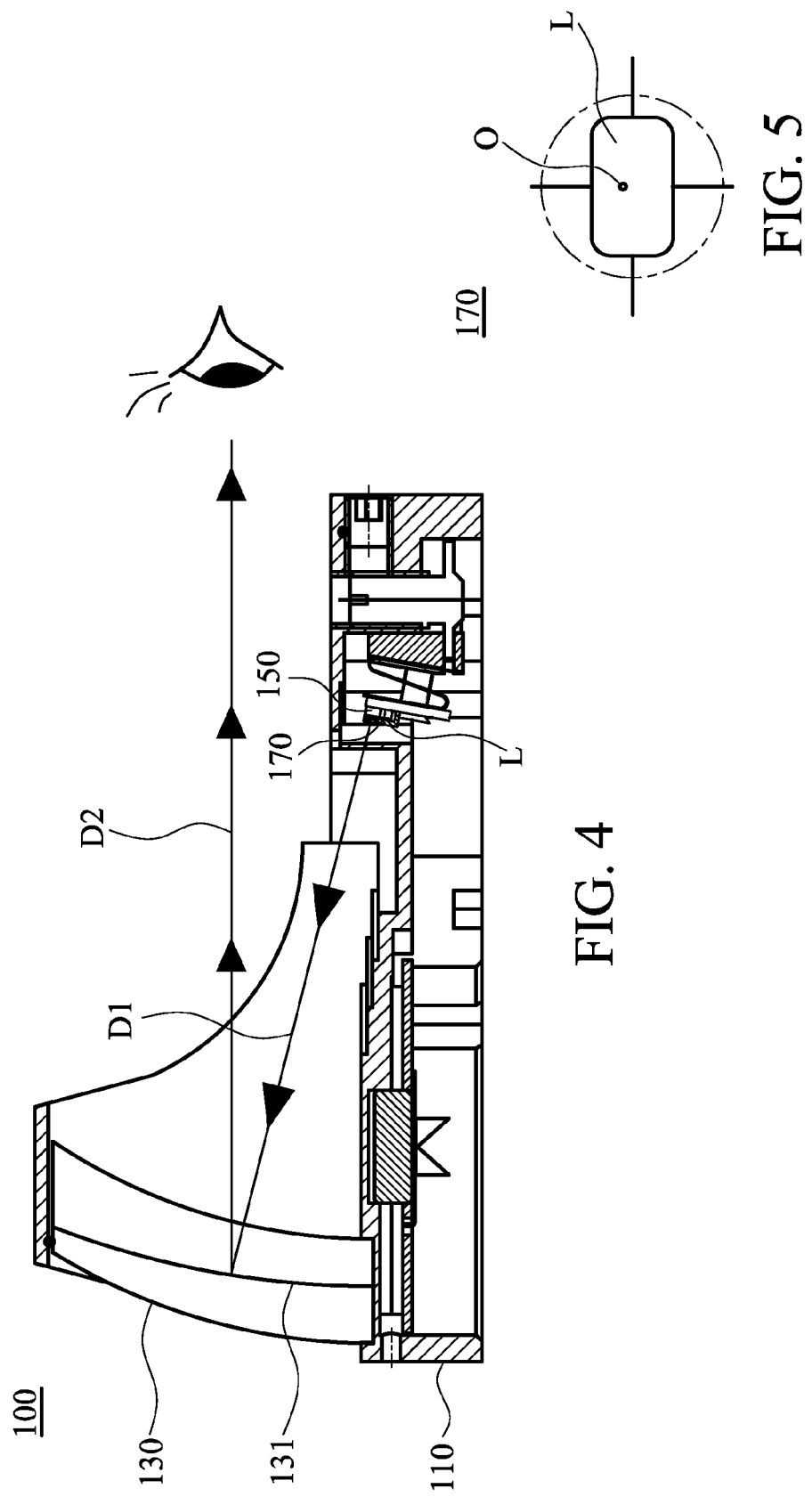

ELECTRONIC SIGHT AND MANUFACTURING METHOD THEREOF

This Application claims priority of Taiwan Patent Application No. 097139493, filed on Oct. 15, 2008, the entirety of which is incorporated by reference herein.

BACKGROUND OF THE INVENTION

1. Field of the Invention

The invention relates to an electronic sight, and in particular, to a reflective sight.

2. Description of the Related Art

Electronic sights are usually called red dot sights. However, the aiming mark of the electronic sights can also be a color other than red (for example green).

FIG. 1 is a schematic view of an electronic sight 10 mounted on a firearm G; and FIG. 2 is an elevational view of the electronic sight 10 and the firearm G in FIG. 1. Referring to FIGS. 1 and 2, the electronic sight 10 is a reflex sight. It is mainly operated by emitting a lightbeam from a light emitting device 101, which projects the lightbeam forward to the objective lens 102, and then is reflected backward by the objective lens 102. Finally, an aiming mark is then formed on the objective lens (as shown in FIG. 2) from which the lightbeam is received by a shooter's eye (referring to error shown in FIG. 1).

Referring to FIG. 2, the shooter is able to see the aiming mark formed on the objective lens 102. However, in addition to the aiming mark a, metallic reflections R also exist around the aiming mark a. The metallic reflections R interfere with the shooter's vision.

FIG. 3 is an enlarged view of portion A in FIG. 1. Referring to FIG. 3, the formation of the metallic reflections R is because of the lightbeam of the light emitting device 101 passing through a photomask before hitting the objective lens 102 for blocking the unnecessary light. Specifically, because the photomask 103 is formed by electroforming of metal, the reflective layer 102R reflects the lightbeam and metallic reflections R from the photomask 103 at the same time.

BRIEF SUMMARY OF THE INVENTION

Accordingly, the invention provides an electronic sight comprising a base, an optical window, a point light source, a photomask and a low-reflective layer. The base has a first end and a second end. The optical window is disposed on the first end of the base. The point light source, disposed on the second end of the base, provides a lightbeam. The photomask is disposed between the point light source and the optical window. The low-reflective layer is formed on the photomask. The lightbeam passes through the photomask along a first direction, hits the optical window, and is reflected toward a second direction by the optical window.

The invention provides a method for manufacturing an electronic sight. The method comprises: providing a base having a first end and a second end; providing an optical window disposed on the first end of the base; providing a point light source disposed on the second end of the base; providing a photomask; forming a low-reflective layer on the photomask; and positioning the photomask between the point light source and the optical window.

BRIEF DESCRIPTION OF THE DRAWINGS

The invention can be more fully understood by reading the subsequent detailed description and examples with references made to the accompanying drawings, wherein:

FIG. 4 is a schematic view of an embodiment of an electronic sight of the invention;

FIG. 5 is a schematic view of an embodiment of a photomask of the invention;

DETAILED DESCRIPTION OF THE INVENTION

Figure 1:
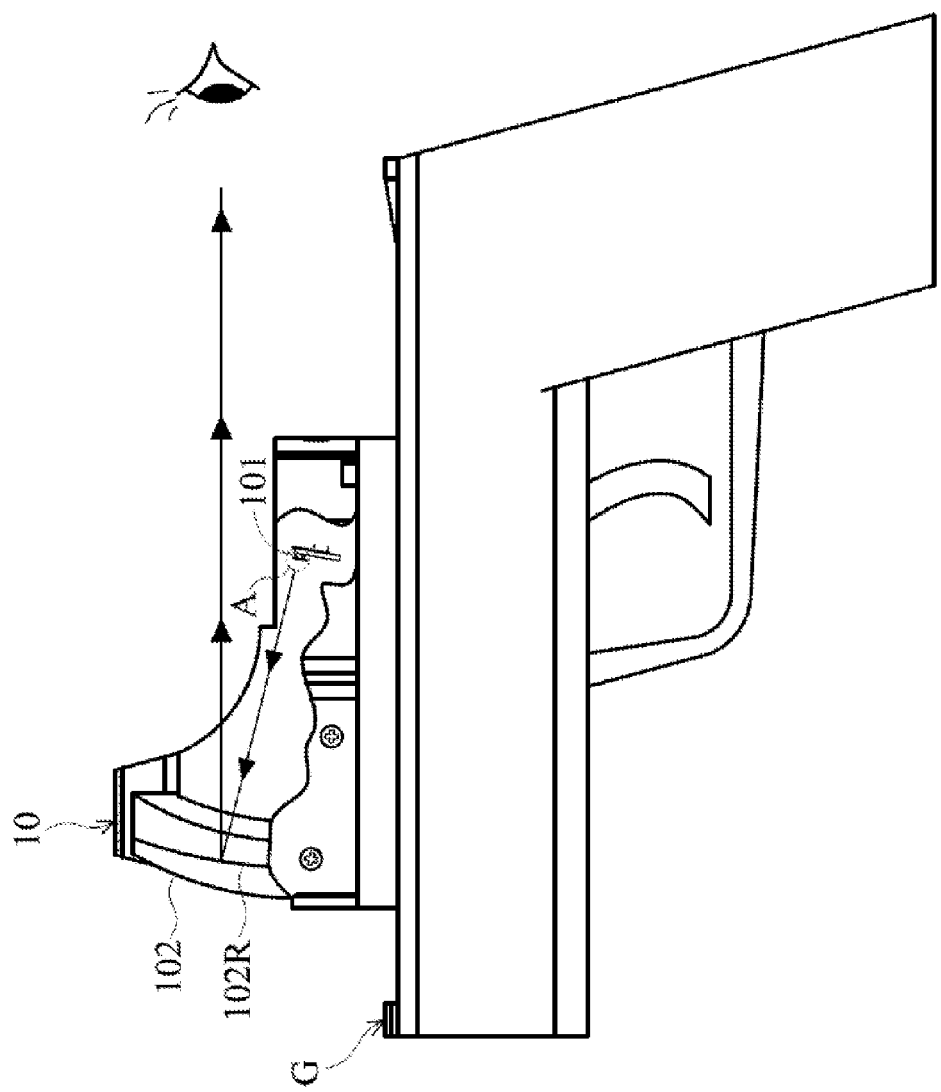
FIG. 1 is a schematic view of a conventional electronic sight mounted on a firearm.
Figure 3:
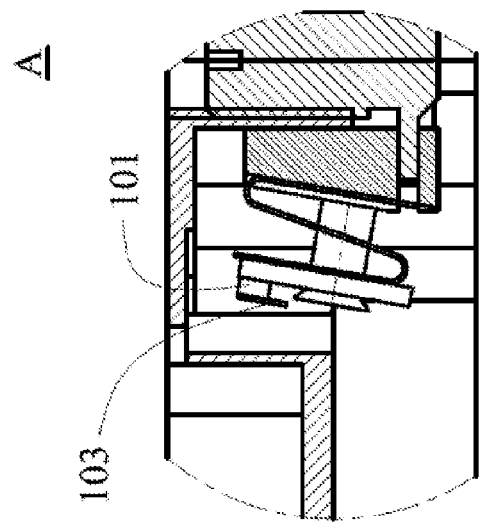
FIG. 3 is an enlarged view of portion A in FIG. 1.
Figure 2:
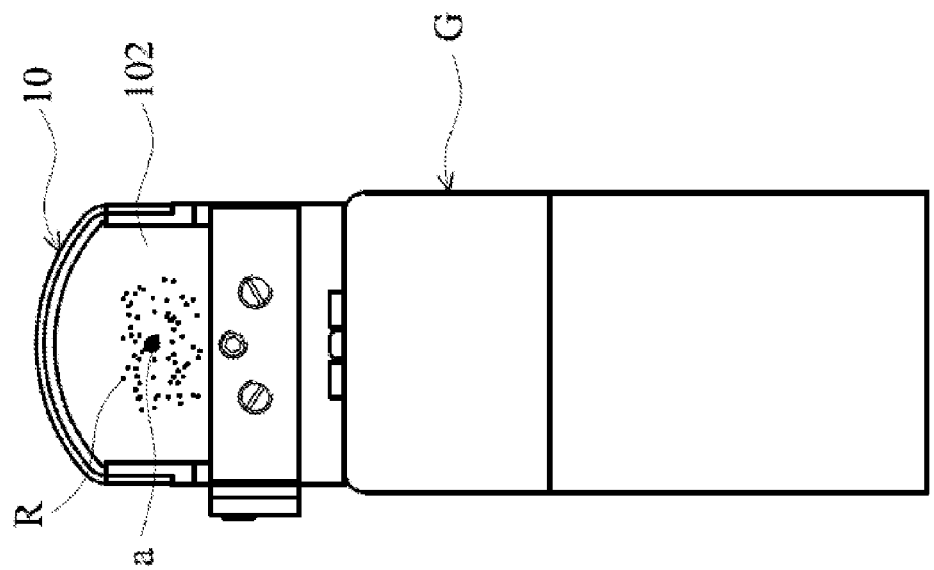
FIG. 2 is an elevational view of the electronic sight and the firearm in FIG. 1.

FIG. 4 is a schematic view of an embodiment of an electronic sight of the invention. Referring to FIG. 4, the electronic sight 100 is a reflective sight comprising a base 110, an optical window 130, a point light source 150 and a photomask 170, wherein the electronic sight 100 is mounted on a firearm by the base 110.

FIG. 5 is a schematic view of the photomask of the embodiment. Referring to FIGS. 4 and 5 at the same time, the optical window 130 includes a reflective layer 131, and the point light source 150 is a light emitting diode (as shown in FIG. 4). The photomask 170, electroformed of Ni, is a thin plate comprising an aperture O (as shown in FIG. 5). A low-reflective layer L is formed on the photomask 170 by covering an Fe—Ni—Cr, $SiO_2$ or other low-reflective material on the photomask 170 by thermal evaporation. The reflectance of the low-reflective layer L is under 45%. Preferably, the reflectance of the low-reflective layer is best controlled under 20%.

Referring to FIG. 4 again, the base 110 has a first end and a second end. The optical window 130 is disposed on the first end of the base 110, the point light source 150 is disposed on the second end of the base 110, and the photomask 170 is disposed between the point light source 150 and the optical window 130. In detail, the photomask 170 is directly disposed on the point light source 150. The point light source 150 provides a lightbeam that passes through the aperture O of the photomask 170 along a first direction D1, hits the optical window 130, and then is reflected by the reflective layer 131 of the optical window 130 along a second direction D2. Finally, the lightbeam is received by a shooter.

Figure 6:
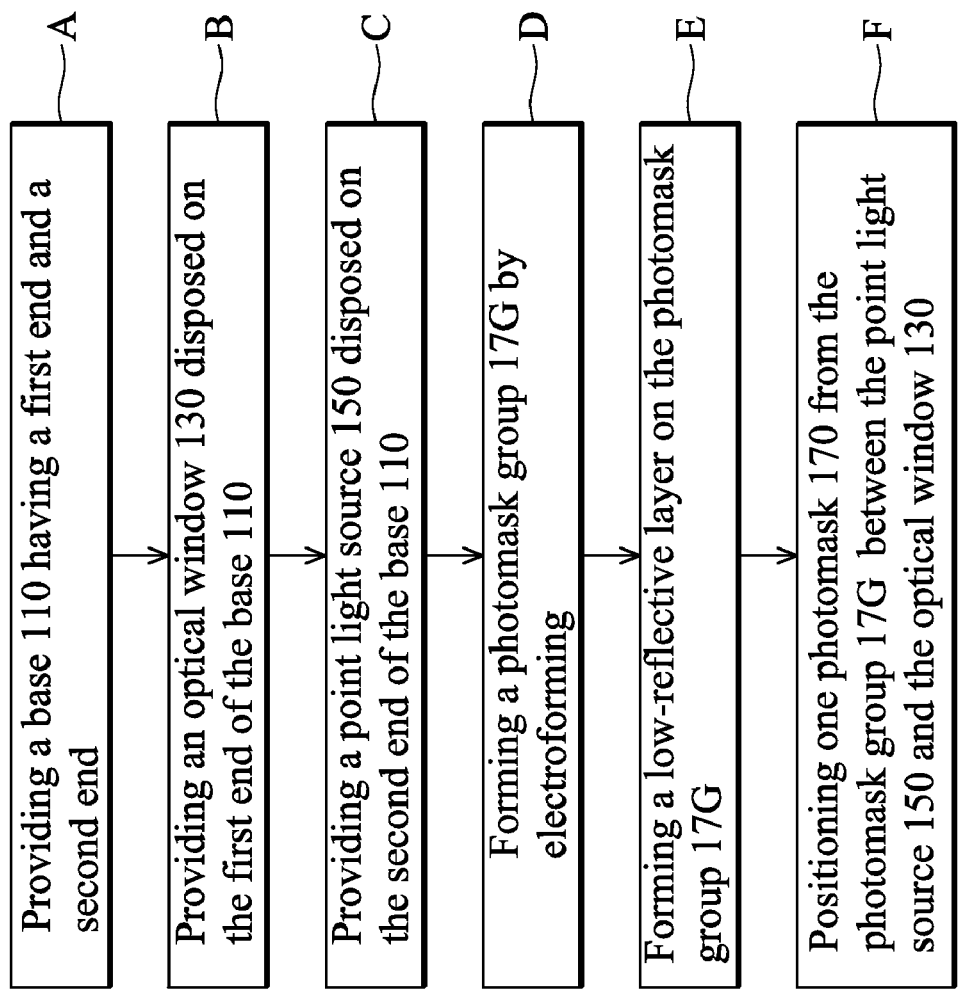
FIG. 6 is a flowchart showing a method for manufacturing the electronic sight.
Figures 7, 8:
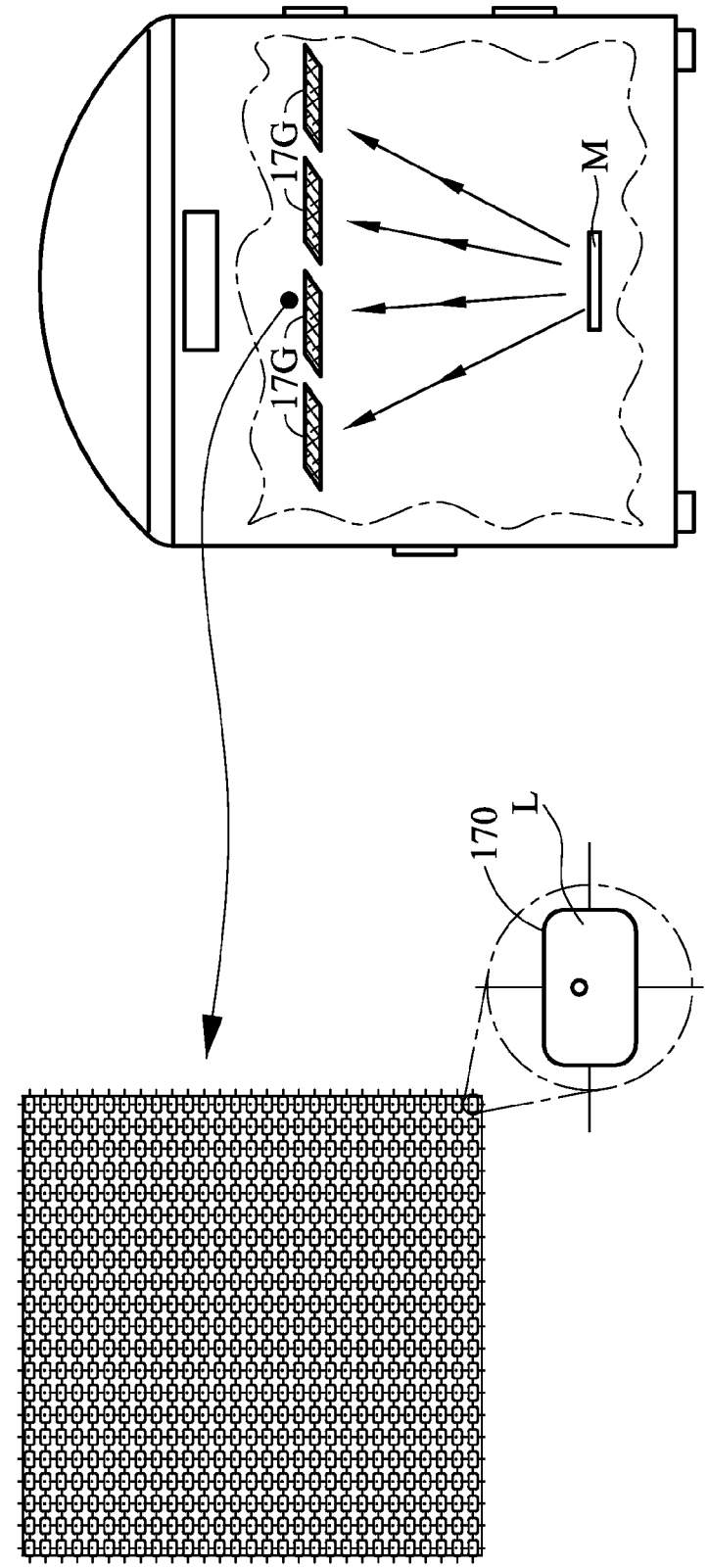
FIG. 7 is a schematic view of a photomask group and the photomask of the invention.
FIG. 8 is a schematic view of a thermal evaporator and the photomask group.

Referring also to FIGS. 6-8, a method for manufacturing the electronic sight is described below. FIG. 6 is a flowchart showing a method for manufacturing the electronic sight, FIG. 7 is a schematic view of a photomask group and the photomask of the invention, and FIG. 8 is a schematic view of a thermal evaporator and the photomask group.

As shown in FIG. 6, the method for manufacturing the electronic sight comprises: A~providing a base 110 having a first end and a second end; B~providing an optical window 130 disposed on the first end of the base 110, wherein the optical window comprises a reflective layer 131; C~providing a point light source 150 disposed on the second end of the base 110, wherein the point light source 150 is a light emitting diode; D~forming a photomask group 17G by electroforming, wherein the photomask group 17G comprises a plurality of photomasks 170 (as shown in FIG. 7); E~forming a low-reflective layer L on the photomask group 17G, wherein the low-reflective layer L has a reflectance under 45% (preferably under 20%), and is formed on the photomask 170 by thermal evaporation, of which the base material M (as shown in FIG. 8) is Fe—Ni—Cr, $SiO_2$ or other low-reflective material; and F~positioning one photomask 170 from the photomask group 17G between the point light source 150 and the optical window 130.

In the electronic sight 100 of the embodiment, the photomask 170 is formed by thermal evaporation. However, a low-reflective layer L covers the photomask 170 in order to block the metallic reflections from the photomask 170, such that the metallic reflections do not exist on the optical window 130 to negatively affect the shooter's vision.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic sight, comprising:
   a base having a first end and a second end;
   an optical window disposed on the first end of the base;
   a point light source, disposed on the second end of the base, providing a lightbeam;
   a photomask disposed between the point light source and the optical window, wherein the photomask comprises an aperture, and the lightbeam passes through the aperture and then hits the optical window; and
   a low-reflective layer formed on the photomask to block metallic reflections from the photomask, wherein the low-reflective layer comprises Fe—Ni—Cr or $SiO_2$;
   wherein the lightbeam passes through the photomask along a first direction, hits the optical window, and is reflected toward a second direction by the optical window.

2. The electronic sight as claimed in claim 1, wherein the photomask is formed by electroforming.

3. The electronic sight as claimed in claim 1, wherein the low-reflective layer is formed on the photomask by thermal evaporation.

4. The electronic sight as claimed in claim 1, wherein the low-reflective layer has a reflectance under 45%.

5. The electronic sight as claimed in claim 1, wherein the point light source is a light emitting diode.

6. The electronic sight as claimed in claim 1, wherein the optical window comprises a reflective layer.

7. The electronic sight as claimed in claim 1, wherein the photomask is a thin plate.

8. A method for manufacturing an electronic sight, comprising:
   providing a base having a first end and a second end;
   providing an optical window disposed on the first end of the base;
   providing a point light source disposed on the second end of the base, wherein the point light source provides a lightbeam;
   providing a photomask, wherein the photomask comprises an aperture, and the lightbeam passes through the aperture and then hits the optical window;
   forming a low-reflective layer on the photomask to block metallic reflections from the photomask, wherein the low-reflective layer is formed on the photomask by thermal evaporation; and
   positioning the photomask between the point light source and the optical window.

9. The method for manufacturing the electronic sight as claimed in claim 8, wherein the low-reflective layer comprises Fe—Ni—Cr or $SiO_2$.

10. The method for manufacturing the electronic sight as claimed in claim 8, wherein the low-reflective layer has a reflectance under 45%.

11. The method for manufacturing the electronic sight as claimed in claim 8, wherein the point light source is a light emitting diode.

12. The method for manufacturing the electronic sight as claimed in claim 8, wherein the optical window comprises a reflective layer.

13. The method for manufacturing the electronic sight as claimed in claim 8, further comprising forming a photomask group, wherein the photomask group comprises a plurality of photomasks.

14. The method for manufacturing the electronic sight as claimed in claim 8, wherein the photomask is electroformed of Ni.

* * * * *